(12) United States Patent
Myrick et al.

(10) Patent No.: US 11,501,279 B2
(45) Date of Patent: *Nov. 15, 2022

(54) APPOINTMENT AND PAYMENT HANDLING

(71) Applicant: Block, Inc., San Francisco, CA (US)

(72) Inventors: Lauren A. Myrick, San Francisco, CA (US); Evan Ginsburg, San Francisco, CA (US); Willem Ave, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/984,135

(22) Filed: Aug. 3, 2020

(65) Prior Publication Data

US 2020/0387886 A1    Dec. 10, 2020

Related U.S. Application Data

(63) Continuation of application No. 15/868,655, filed on Jan. 11, 2018, now Pat. No. 10,733,595, which is a
(Continued)

(51) Int. Cl.
*G06Q 20/40* (2012.01)
*G06Q 20/32* (2012.01)
(Continued)

(52) U.S. Cl.
CPC ... *G06Q 20/3224* (2013.01); *G06Q 10/06314* (2013.01); *G06Q 10/109* (2013.01); *G06Q 10/1095* (2013.01); *G06Q 20/40* (2013.01)

(58) Field of Classification Search
CPC .......... G06Q 10/1095; G06Q 20/3224; G06Q 10/109; G06Q 20/40; G06Q 10/06314
(Continued)

(56) References Cited

U.S. PATENT DOCUMENTS 6,112,185 A    8/2000  Walker et al.
6,266,649 B1   7/2001  Linden et al.
(Continued)

FOREIGN PATENT DOCUMENTS

AU    2018260870 A1   11/2018
WO     01/53991 A1    7/2001
(Continued)

OTHER PUBLICATIONS

Google NPL (non-patent literature) Search, dated Feb. 10, 2022. (Year: 2022).*
(Continued)

*Primary Examiner* — Hai Tran
(74) *Attorney, Agent, or Firm* — Lee & Hayes, P.C.

(57) ABSTRACT

An appointment and payment handling system may operate to handle payments for appointments based on user locations at times associated with appointments. The appointment and payment handling system may determine if a location of a customer device associated with a customer associated with an appointment matches a location associated with the appointment. If the locations match, the appointment and payment handling system may create a payment record for a payment to the merchant from the customer based on the determination that the customer location matches the location associated with the appointment.

20 Claims, 9 Drawing Sheets

Related U.S. Application Data continuation of application No. 14/498,632, filed on Sep. 26, 2014, now Pat. No. 9,875,471.

(51) Int. Cl.
 *G06Q 10/06* (2012.01)
 *G06Q 10/10* (2012.01)

(58) Field of Classification Search
 USPC .................................................. 705/35–45
 See application file for complete search history.

(56) References Cited

U.S. PATENT DOCUMENTS

| | | |
|---|---|---|
| 6,529,880 B1 | 3/2003 | McKeen et al. |
| 6,748,364 B1 | 6/2004 | Waytena et al. |
| 6,845,361 B1 | 1/2005 | Dowling |
| 6,868,391 B1 | 3/2005 | Hultgren |
| 6,973,437 B1 | 12/2005 | Olewicz et al. |
| 7,069,228 B1 | 6/2006 | Rose et al. |
| 7,082,402 B2 | 7/2006 | Conmy et al. |
| 7,328,166 B1 | 2/2008 | Geoghegan et al. |
| 7,620,562 B2 | 11/2009 | Henry et al. |
| 7,933,789 B2 | 4/2011 | Boland et al. |
| 3,166,121 A1 | 4/2012 | Farrell et al. |
| 8,244,566 B1 | 8/2012 | Coley et al. |
| 8,498,900 B1 | 7/2013 | Spirin et al. |
| 8,583,511 B2 | 11/2013 | Hendrickson |
| 8,671,009 B1 | 3/2014 | Coley et al. |
| 8,744,968 B1 | 6/2014 | Grigg et al. |
| 8,811,892 B2 | 8/2014 | Khan et al. |
| 8,818,858 B1 | 8/2014 | Parimi et al. |
| 9,058,597 B2 | 6/2015 | DeLuca et al. |
| 9,712,671 B2 | 7/2017 | Monegan et al. |
| 9,875,471 B1 | 1/2018 | Myrick et al. |
| 10,152,680 B1 | 12/2018 | Myrick et al. |
| 10,395,186 B1 | 8/2019 | McCullough et al. |
| 10,726,393 B2 | 7/2020 | Kaumnan |
| 10,733,595 B2 | 8/2020 | Myrick et al. |
| 2002/0002478 A1 | 1/2002 | Swart et al. |
| 2002/0072974 A1 | 6/2002 | Pugliese, III et al. |
| 2002/0111856 A1 | 8/2002 | Messer et al. |
| 2003/0189498 A1 | 10/2003 | Kakihara et al. |
| 2003/0220835 A1 | 11/2003 | Barnes, Jr. |
| 2004/0034537 A1 | 2/2004 | Gengarella et al. |
| 2004/0077347 A1 | 4/2004 | Lauber et al. |
| 2004/0199412 A1 | 10/2004 | McCauley |
| 2004/0243430 A1 | 12/2004 | Horstemeyer |
| 2005/0080675 A1 | 4/2005 | Lovegreen et al. |
| 2005/0102154 A1 | 5/2005 | Dodd et al. |
| 2005/0108116 A1 | 5/2005 | Dobson et al. |
| 2005/0119937 A1 | 6/2005 | Estes |
| 2005/0267787 A1 | 12/2005 | Rose et al. |
| 2006/0047537 A1 | 3/2006 | Brimdyr |
| 2006/0095434 A1 | 5/2006 | McCullough et al. |
| 2006/0242154 A1 | 10/2006 | Rawat et al. |
| 2007/0083403 A1 | 4/2007 | Baldwin et al. |
| 2007/0162308 A1 | 7/2007 | Peters |
| 2007/0255586 A1 | 11/2007 | Green et al. |
| 2007/0274495 A1 | 11/2007 | Youd et al. |
| 2008/0052110 A1 | 2/2008 | Ruggirello et al. |
| 2008/0154654 A1 | 6/2008 | Niessen et al. |
| 2008/0195428 A1 | 8/2008 | O'Sullivan |
| 2008/0284562 A1 | 11/2008 | Arthurs et al. |
| 2008/0306781 A1 | 12/2008 | Gerlach et al. |
| 2009/0055208 A1 | 2/2009 | Kaiser |
| 2009/0172035 A1 | 7/2009 | Lessing et al. |
| 2009/0325606 A1 | 12/2009 | Farris |
| 2010/0004989 A1 | 1/2010 | Bonalle et al. |
| 2010/0015993 A1 | 1/2010 | Dingier et al. |
| 2010/0191552 A1 | 7/2010 | Behrens et al. |
| 2010/0293029 A1 | 11/2010 | Olliphant |
| 2010/0293065 A1 | 11/2010 | Brody et al. |
| 2011/0022424 A1 | 1/2011 | VonDerheide |
| 2011/0099116 A1 | 4/2011 | Gabel |
| 2011/0137692 A1 | 6/2011 | Sethna |
| 2011/0153495 A1 | 6/2011 | Dixon et al. |
| 2011/0191122 A1 | 8/2011 | Kharraz Tavakol et al. |
| 2011/0191184 A1 | 8/2011 | Blackhurst et al. |
| 2011/0215933 A1 | 9/2011 | Darling, IV et al. |
| 2011/0246247 A1 | 10/2011 | McCullough et al. |
| 2011/0251881 A1 | 10/2011 | Maine |
| 2011/0313806 A1 | 12/2011 | Huang |
| 2011/0313867 A9 | 12/2011 | Silver |
| 2011/0314115 A1 | 12/2011 | Nagaraj |
| 2012/0016745 A1 | 1/2012 | Hendrickson |
| 2012/0035952 A1 | 2/2012 | Coyne |
| 2012/0072274 A1 | 3/2012 | King |
| 2012/0143753 A1 | 6/2012 | Gonzalez et al. |
| 2012/0166332 A1 | 6/2012 | Naaman |
| 2012/0173350 A1 | 7/2012 | Robson |
| 2012/0173396 A1 | 7/2012 | Melby et al. |
| 2012/0191551 A1 | 7/2012 | Lutnick et al. |
| 2012/0197670 A1 | 8/2012 | Poon |
| 2012/0203619 A1 | 8/2012 | Lutnick et al. |
| 2012/0209672 A1 | 8/2012 | Winner et al. |
| 2012/0215855 A1 | 8/2012 | Goodman et al. |
| 2012/0239504 A1 | 9/2012 | Curlander et al. |
| 2012/0265585 A1 | 10/2012 | Muirbrook et al. |
| 2012/0278165 A1 | 11/2012 | Mercur et al. |
| 2012/0296680 A1 | 11/2012 | Jantz et al. |
| 2012/0323789 A1 | 12/2012 | Salonen |
| 2013/0013350 A1 | 1/2013 | McCullough et al. |
| 2013/0030965 A1 | 1/2013 | Nuzzi et al. |
| 2013/0046626 A1 | 2/2013 | Grigg et al. |
| 2013/0046635 A1 | 2/2013 | Grigg et al. |
| 2013/0060591 A1 | 3/2013 | Meegan |
| 2013/0080239 A1 | 3/2013 | Okerlund |
| 2013/0090959 A1 | 4/2013 | Kvamme et al. |
| 2013/0090963 A1 | 4/2013 | Sharma et al. |
| 2013/0144660 A1 | 6/2013 | Martin |
| 2013/0166398 A1 | 6/2013 | Minde |
| 2013/0179348 A1 | 7/2013 | Crofts et al. |
| 2013/0185125 A1 | 7/2013 | Celorio-Martinez et al. |
| 2013/0210461 A1 | 8/2013 | Moldaysky et al. |
| 2013/0218780 A1 | 8/2013 | Buzz |
| 2013/0262307 A1 | 10/2013 | Fasoli et al. |
| 2013/0282412 A1 | 10/2013 | Dingier et al. |
| 2013/0325526 A1 | 12/2013 | Tyler |
| 2013/0332207 A1 | 12/2013 | Brunel et al. |
| 2013/0332208 A1 | 12/2013 | Mehta |
| 2013/0332255 A1 | 12/2013 | Carlson et al. |
| 2013/0332509 A1 | 12/2013 | Schwartz et al. |
| 2014/0012688 A1 | 1/2014 | McGuinness et al. |
| 2014/0025524 A1 | 1/2014 | Sims et al. |
| 2014/0039999 A1 | 2/2014 | Levene et al. |
| 2014/0046845 A1 | 2/2014 | Dogin et al. |
| 2014/0052516 A1 | 2/2014 | Beighley, Jr. |
| 2014/0085109 A1 | 3/2014 | Stefik et al. |
| 2014/0089956 A1 | 3/2014 | Shah et al. |
| 2014/0095232 A1 | 4/2014 | Shiva et al. |
| 2014/0095239 A1* | 4/2014 | Mansfield ............ G06Q 10/10 705/7.15 |
| 2014/0136259 A1 | 5/2014 | Kinsey, II et al. |
| 2014/0136443 A1 | 5/2014 | Kinsey et al. |
| 2014/0156410 A1 | 6/2014 | Wuersch et al. |
| 2014/0156517 A1 | 6/2014 | Argue et al. |
| 2014/0188509 A1 | 7/2014 | Palestrant et al. |
| 2014/0188703 A1 | 7/2014 | Tse et al. |
| 2014/0207509 A1 | 7/2014 | Yu et al. |
| 2014/0242905 A1 | 8/2014 | Steely et al. |
| 2014/0244324 A1 | 8/2014 | Ford et al. |
| 2014/0278671 A1 | 9/2014 | Leonhardt et al. |
| 2014/0278679 A1 | 9/2014 | Navani et al. |
| 2014/0279420 A1 | 9/2014 | Okerlund et al. |
| 2014/0316835 A1 | 10/2014 | Cortes et al. |
| 2014/0343977 A1 | 11/2014 | Macina |
| 2014/0351032 A1 | 11/2014 | Cockburn et al. |
| 2015/0006221 A1 | 1/2015 | Mermelstein |
| 2015/0039357 A1 | 2/2015 | Segal et al. |
| 2015/0046271 A1 | 2/2015 | Scholl et al. |
| 2015/0046296 A1 | 2/2015 | Hart |
| 2015/0120344 A1 | 4/2015 | Rose |
| 2015/0120453 A1 | 4/2015 | Lee et al. |

(56) References Cited

U.S. PATENT DOCUMENTS

| | | |
|---|---|---|
| 2015/0120504 A1 | 4/2015 | Todasco |
| 2015/0149542 A1 | 5/2015 | Jain et al. |
| 2015/0235183 A1 | 8/2015 | Sampson et al. |
| 2015/0235268 A1 | 8/2015 | Bell et al. |
| 2015/0242764 A1 | 8/2015 | Subbaraj |
| 2016/0117612 A1 | 4/2016 | Hong et al. |
| 2016/0148163 A1 | 5/2016 | Beaumont et al. |
| 2016/0267439 A1 | 9/2016 | Bitran et al. |
| 2016/0328681 A1 | 11/2016 | Portnoy et al. |
| 2016/0335686 A1 | 11/2016 | Tlrumala et al. |
| 2016/0350720 A1 | 12/2016 | Moorjani et al. |
| 2017/0352006 A1 | 12/2017 | Yu et al. |
| 2018/0150825 A1 | 5/2018 | Myrick et al. |
| 2019/0303972 A1 | 10/2019 | Myrick et al. |
| 2020/0265387 A1 | 8/2020 | Ave et al. |
| 2021/0350334 A1 | 11/2021 | Ave et al. |

FOREIGN PATENT DOCUMENTS

| | | |
|---|---|---|
| WO | 2014/078672 A2 | 5/2014 |
| WO | 2016/049555 A1 | 3/2016 |

OTHER PUBLICATIONS

Dialog Search, dated Jun. 18, 2022. (Year: 2022).*
Google Scholar Search, dated Jun. 18, 2022. (Year: 2022).*
Google Patents Search, dated Jun. 18, 2022. (Year: 2022).*
Examination Report No. 2 for AU Application No. 2018260870 dated Oct. 26, 2020.
Gervasio, M.T., et al. "Active Preference Learning for Personalized Calendar Scheduling Assistance", San Diego, California, Jan. 9-12, 2005, pp. 1-8.
Non-Final Office Action dated Sep. 22, 2020, for U.S. Appl. No. 16/446,536, of Myrick, L.A., et al., filed Jun. 19, 2019.
Non-Final Office Action dated Sep. 4, 2020, for U.S. Appl. No. 16/589,076, of Rose C., filed Sep. 30, 2019.
Buttle, F.A., "Word of mouth: understanding and managing referral marketing," Journal of Strategic Marketing, vol. 6, Issue 3, pp. 241-254 (1998).
Och, F.J., and Weber, H.,"Improving Statistical Natural Language Translation with Categories and Rules," pp. 985-989 (Year: 1998).
Weaver, P., "A Brief History of Scheduling—Back To The Future," Mosaic Project Services Pty Ltd, pp. 1-24 (Apr. 4-6, 2006).
Weaver, P., "A Brief History of Scheduling" Retrieved from the Internet URL: https://mosaicprojects.com.au/Resources_Papers_042.html, pp. 1-2 (2006).
Non-Final Office Action dated May 7, 2015, for U.S. Appl. No. 14/498,632, of Myrick, L., et al., filed Sep. 26, 2014.
Final Office Action dated Sep. 1, 2015, for U.S. Appl. No. 14/498,632, of Myrick, L., et al., filed Sep. 26, 2014.
Non-Final Office Action dated Jul. 1, 2016, for U.S. Appl. No. 14/498,632, of Myrick, L., et al., filed Sep. 26, 2014.
Non-Final Office Action dated Dec. 20, 2016, for U.S. Appl. No. 14/224,804, of Rose, C., filed Mar. 25, 2014.
Final Office Action dated Apr. 14, 2017, for U.S. Appl. No. 14/498,632, of Myrick, L., et al., filed Sep. 26, 2014.
Non-Final Office Action dated Apr. 17, 2017, for U.S. Appl. No. 14/498,755, of Myrick, L., et al., filed Sep. 26, 2014.
Advisory Action dated Jun. 23, 2017, for U.S. Appl. No. 14/498,632, of Myrick, L., et al., filed Sep. 26, 2014.
Final Office Action dated Aug. 11, 2017, for U.S. Appl. No. 14/224,804, of Rose, C., filed Mar. 25, 2014.
Notice of Allowance dated Sep. 13, 2017, for U.S. Appl. No. 14/498,632, of Myrick, L., et al., filed Sep. 26, 2014.
Non-Final Office Action dated Oct. 5, 2017, for U.S. Appl. No. 14/498,782, of Myrick, L., et al., filed Sep. 26, 2014.
Non-Final Office Action dated Oct. 5, 2017, for U.S. Appl. No. 14/498,789, of Myrick, L., et al., filed Sep. 26, 2014.
Final Office Action dated Oct. 26, 2017, for U.S. Appl. No. 14/498,755, of Myrick, L., et al., filed Sep. 26, 2014.
Non-Final Office Action dated Dec. 20, 2017, for U.S. Appl. No. 14/735,877, of Ave, W., et al., filed Jun. 10, 2015.
Non-Final Office Action dated Jan. 25, 2018, for U.S. Appl. No. 14/735,966, of Ave, W., et al., filed Jun. 10, 2015.
Non-Final Office Action dated Mar. 2, 2018, for U.S. Appl. No. 14/498,755, of Myrick, L., et al., filed Sep. 26, 2014.
Final Office Action dated Mar. 29, 2018, for U.S. Appl. No. 14/498,789, of Myrick, L., et al., filed Sep. 26, 2014.
Final Office Action dated Apr. 26, 2018 , for U.S. Appl. No. 14/498,782, of Myrick, L., et al., filed Sep. 26, 2014.
Final Office Action dated Jun. 11, 2018, for U.S. Appl. No. 14/735,877, of Ave, W., et al., filed Jun. 10, 2015.
Non-Final Office Action dated Jun. 28, 2018, for U.S. Appl. No. 14/498,789, of Myrick, L., et al., filed Sep. 26, 2014.
Non-Final Office Action dated Jul. 2, 2018, for U.S. Appl. No. 14/224,804, of Rose, C., filed Mar. 25, 2014.
Notice of Allowance dated Jul. 18, 2018, for U.S. Appl. No. 14/498,755, of Myrick, L., et al., filed Sep. 26, 2014.
Final Office Action dated Jul. 26, 2018, for U.S. Appl. No. 14/735,966, of Ave, W., et al., filed Jun. 10, 2015.
Non-Final Office Action dated Aug. 27, 2018, for U.S. Appl. No. 14/498,782, of Myrick, L., et al., filed Sep. 26, 2014.
Advisory Action dated Oct. 9, 2018, for U.S. Appl. No. 14/735,877, of Ave, W., et al., filed Jun. 10, 2015.
Examination Report No. 2 for Australian Patent Application No. 2015320316, dated Nov. 7, 2018.
Non-Final Office Action dated Nov. 9, 2018, for U.S. Appl. No. 14/735,877, of Ave, W., et al., filed Jun. 10, 2015.
Examiner Requisition for Canadian Patent Application No. 2,959,547, dated Nov. 23, 2018.
Final Office Action dated Dec. 31, 2018, for U.S. Appl. No. 14/498,789, of Myrick, L., et al., filed Sep. 26, 2014.
Final Office Action dated Jan. 2, 2019 , for U.S. Appl. No. 14/498,782, of Myrick, L., et al., filed Sep. 26, 2014.
Non-Final Office Action dated Jan. 11, 2019, for U.S. Appl. No. 14/735,966, of Ave, W., et al., filed Jun. 10, 2015.
Final Office Action dated Jan. 28, 2019, for U.S. Appl. No. 14/224,804, of Rose, C., filed Mar. 25, 2014.
Final Office Action dated Mar. 26, 2019, for U.S. Appl. No. 14/735,877, of Ave, W. et al., filed Jun. 10, 2015.
Non Final Office Action dated Jun. 13, 2019, for U.S. Appl. No. 14/224,804, of Rose, C., filed Mar. 25, 2014.
Advisory Action dated Jun. 20, 2019, for U.S. Appl. No. 14/735,877, of Ave, W. et al., filed Jun. 10, 2015.
Non Final Office Action dated Jul. 26, 2019, for U.S. Appl. No. 14/735,877, of Ave, W., et al., filed Jun. 10, 2015.
Final Office Action dated Aug. 22, 2019, for U.S. Appl. No. 14/735,966, of Ave, W., et al., filed Jun. 10, 2015.
Non-Final Office Action dated Oct. 30, 2019, for U.S. Appl. No. 15/868,655, of Myrick, L.A., et al., filed Jan. 11, 2018.
Advisory Action dated Nov. 26, 2019, for U.S. Appl. No. 14/735,966, of Ave, W., et al., filed Jun. 10, 2015.
Final Office Action dated Dec. 19, 2019, for U.S. Appl. No. 14/735,877, of Ave, W., et al., filed Jun. 10, 2015.
Final Office Action dated Dec. 27, 2019, for U.S. Appl. No. 14/224,804, of Rose, C., filed Mar. 25, 2014.
Notice of Allowance dated Mar. 25, 2020, for U.S. Appl. No. 15/868,655, of Myrick, L.A., et al., filed Jan. 11, 2018.
Non-Final Office Action dated Apr. 8, 2020, for U.S. Appl. No. 14/735,966, of Ave, W., et al., filed Jun. 10, 2015.
Examination Report No. 1 for Australian Patent Application No. 2015320316, dated Nov. 8, 2017.
Examiner Requisition for Canadian Patent Application No. 2,959,547, dated Dec. 7, 2017.
Examiner's Requisition for Canadian Patent Application No. 2,959,547, dated Nov. 7, 2019.
Examination Report No. 1 for AU Application No. 2018260870 dated Feb. 26, 2020.
Non-Final Office Action dated Mar. 10, 2021, for U.S. Appl. No. 16/589,076, of Rose C. et al., filed Sep. 30, 2019.
Examination Report No. 3 for Australian Application No. 2018260870 dated Feb. 24, 2021.

(56) References Cited

OTHER PUBLICATIONS

Busemann, S., "Automating NL Appointment Scheduling with COSMA", DFKI GmbH, pp. 5-6 (Year:1997).
Notice of Allowance dated Jan. 1, 2021, for U.S. Appl. No. 14/735,966, of Ave, W., et al., filed Jun. 10, 2015.
Notice of Allowance dated Jan. 22, 2021, for U.S. Appl. No. 16/446,536, of Myrick, L.A., et al., filed Jun. 19, 2019.
Notice of Allowance for Canadian Patent Application No. 2,959,547, dated Jul. 14, 2020.
International Search Report and Written Opinion for PCT Application No. PCT/US2015/052406, dated Nov. 4, 2015.
Examiner's Requisition for Canadian Patent Application No. 3,098,346, dated Nov. 1, 2021.
Final Office Action dated Jun. 3, 2021, for U.S. Appl. No. 16/589,076, of Rose C. et al., filed Sep. 30, 2019.
Examination Report No. 1 for AU Application No. 2021201280 dated Feb. 10, 2022.
Examination Report No. 2 for AU Application No. 2021201280 dated Aug. 3, 2022.

\* cited by examiner

APPOINTMENT AND PAYMENT HANDLING

RELATED APPLICATIONS

This application claims priority to and is a continuation application of U.S. patent application Ser. No. 15/868,655, filed Jan. 11, 2018 and granted Aug. 4, 2020 as U.S. Pat. No. 10,733,595, which claims priority to and is a continuation application of U.S. patent application Ser. No. 14/498,632, filed on Sep. 26, 2014 and granted Jan. 23, 2018 as U.S. Pat. No. 9,875,471, the entire contents of which are incorporated herein by reference.

BACKGROUND

Providers of services and goods often interact with customers based on a schedule of appointments or similar scheduling items (e.g. reservations at restaurants, waitlists for salons, etc.). For example, restaurants may take reservations for parties of customers on certain dates and times. In another example, an instructor of a yoga class may have reserved slots for respective customers in each class session. Managing appointments (e.g. creating appointments, updating appointments in response to customer requests or changes in the merchant's schedule) and handling payments from customers to the merchants may represent a significant burden on the merchant. For example, the instructor of the above mentioned yoga class may find tasks such as keeping track of appointment change requests, attendance of his customers to the sessions and replacing customers that cancel by offering the appointment slots of the cancellations to other customers to be difficult.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
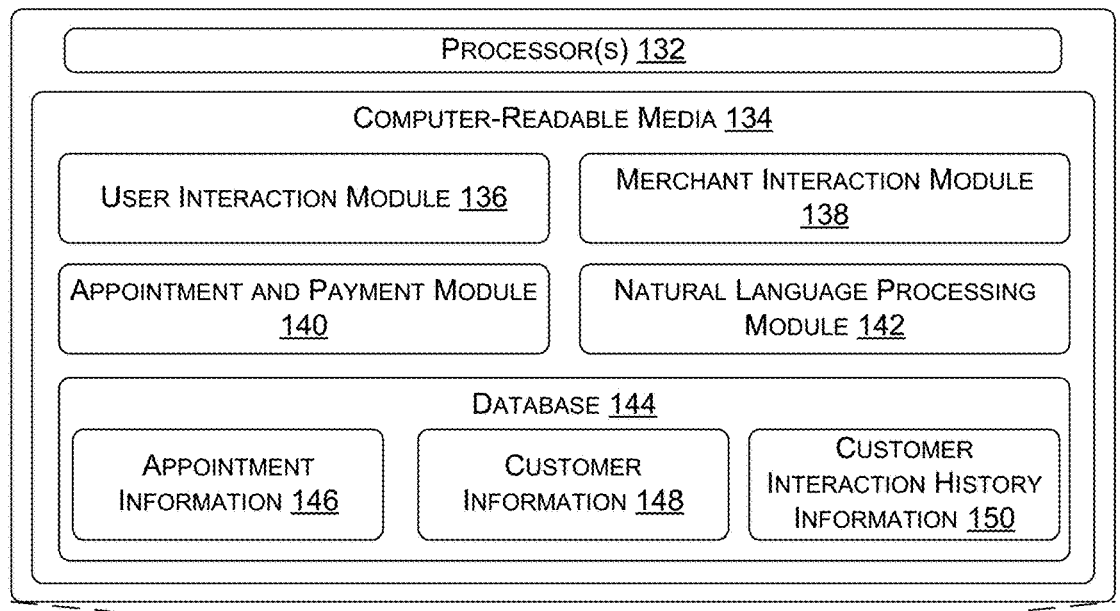
FIG. 1 illustrates an example system for handling appointments and payments among customers and merchants.
Figure 1:
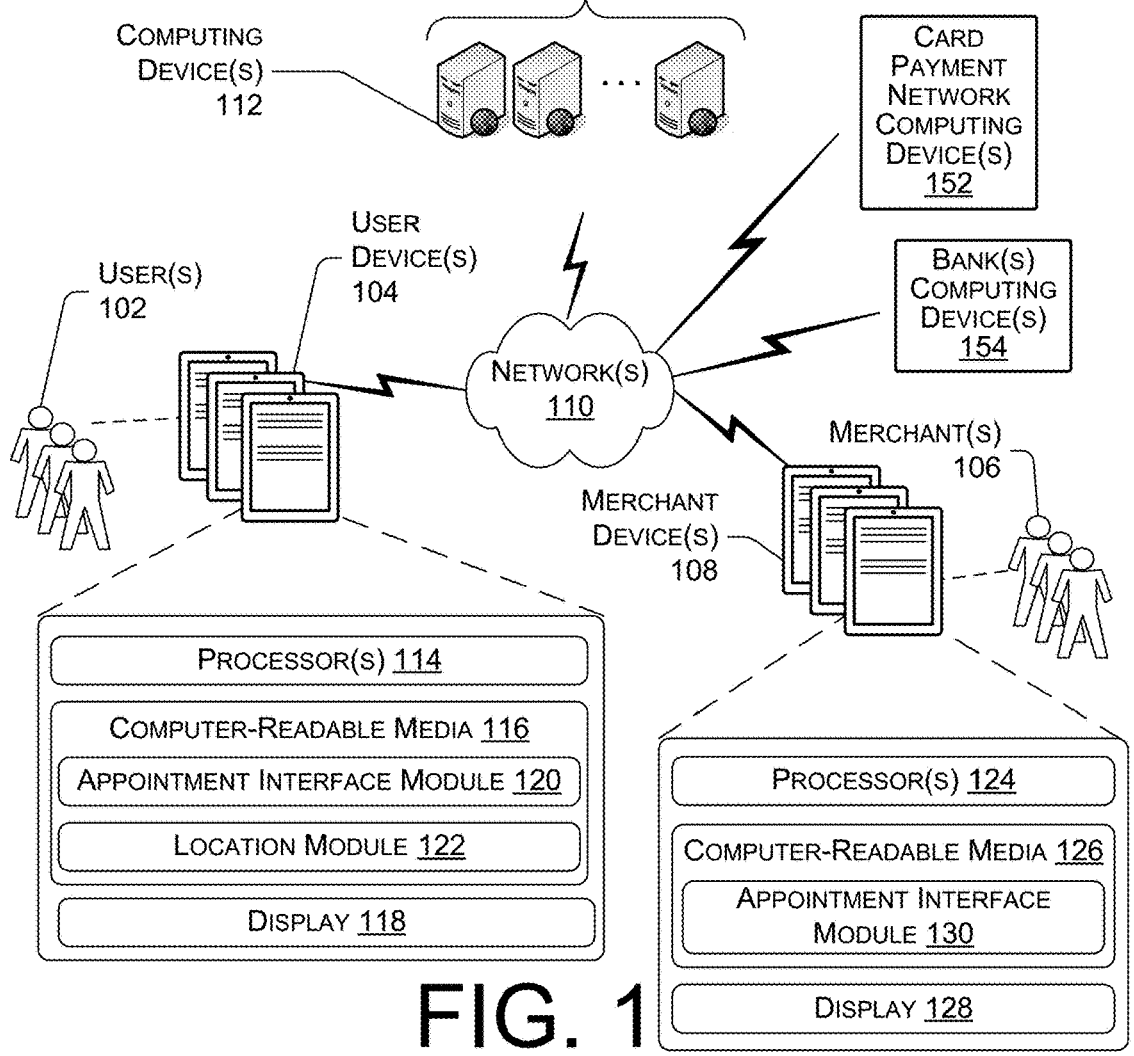

This disclosure describes systems and processes for handling appointments and payments among customers and merchants. In some examples herein, the system may allow for payment processing based on appointments and customer locations. For instance, the techniques herein may include determining if a customer is present at a location associated with the appointment and creating a payment record (i.e. a billing item) for the customer for the service associated with the appointment.

In addition, the system may provide for handling of changes in previously made appointments prior to the appointment time. For instance, four customers may have a reservation with a restaurant with an equal bill splitting arrangement. One of the customers may request the addition of two more customers to the reservation. The system may operate to verify that the change is available, for example, by contacting the merchant or automatically by analyzing information known about the merchant or obtained from a device of the merchant. If the change is available, the system may implement the change on behalf of the customer and merchant.

Moreover, the system may provide for handling referrals on behalf of a merchant. For example, a merchant may be unable to fulfill the appointment or may be unable to accept an appointment request. In such a case, the merchant may be asked to identify (or may have previously identified) one or more other merchants to which to refer the appointment request. The system may then determine which of the other merchants is available from the other merchants' scheduling information (i.e. the system may maintain or query the other merchants' scheduling information). The system may then provide the customer initially requesting the appointment with identification of the available other merchants recommended by the merchant the customer initially desired.

Additionally, the system may determine unbooked appointment slots of a merchant's schedule that the merchant may desire to fill. For example, the system may analyze customer information (e.g. schedule, task list, current location, etc.) and/or the history of customer interactions between the customers and the merchant to determine customers that may be interested in the unbooked appointment slots. The merchant may be presented with the determined customer and may make the offer to the customer manually or the system may offer the appointment slot to the customer automatically.

Details of these and other example implementations are described below. This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many. For example, though discussed herein in the context of an appointment and payment handling system, implementations are not so limited.

FIG. 1 illustrates an example system 100 for handling appointments and payments among customers and merchants. As shown in FIG. 1, the system 100 may include one or more user(s) 102 (e.g. customers), one or more user device(s) 104 associated with the user(s) 102, one or more merchants 106, one or more merchant devices 108 associated with the one or more merchants 106, one or more network(s) 110, and one or more computing device(s) 112. In various implementations, the user(s) 102 may operate the user device(s) 104, which may include one or more processor(s) 114, computer-readable media 116 and a display 118. The computer-readable media 116 may store an appointment interface module 120 and a location module 122. Similarly, the merchant(s) 106 may operate the merchant device(s) 108, which may include one or more processor(s) 124, computer-readable media 126 and a display 128. The computer-readable media 126 may store an appointment interface module 130. The computing device(s) 112 may also include one or more processor(s) 132 and computer-readable media 134, which may store a user interaction module 136, a merchant interaction module 138, an appointment and payment module 140, a natural language processing module 142 and a database 144. In various implementations, the computing device(s) 112 may be, for example, computing device(s) physically located in the merchant buildings (e.g. in a shared space of one or more merchants), networked computing device(s) of a service company, or may be cloud services.

In some implementations, one of the users 102 may operate a user device 104 to perform various functions associated with the user device 104. For example, a user of the user(s) 102 may utilize the user device 104, and particularly the appointment interaction module 120 thereof, to interact with the computing devices 112. The location module 122 may be utilized to determine the location of the user device at any given time.

In some implementations, the user device 104 may be any type of device that is capable of interacting with the computing device(s) 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as for a user dashboard to enable the user to control information in a user's profile, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), non-volatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. The user 102 may utilize the foregoing features to interact with the user device 104 or the computing device(s) 112 via the network(s) 110. More particularly, the display 118 of the user device 104 may include any type of display 118 known in the art that is configured to present (e.g., display) information to the users 102.

In various implementations, the one or more merchants 106 may be any individual, entity, or machine that offers services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 124, the computer-readable media 126, and/or the display 128. The merchants 106 may utilize the merchant devices 108 to interact with the computing device(s) 112 in any manner. For instance, the merchant devices 108 may be used to access an interface associated with the computing device(s) 112 (e.g. the appointment interface module 130).

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implement as more modules or as fewer modules and functions described for the modules may be redistributed depending on the details of the implementation. Further, in some implementations, the user devices 104 and/or merchant devices 108 may vary from device to device. In general, the user devices 104 and the merchant devices 108 can each be any appropriate device operable to send and receive requests, messages, or other types of information over the one or more networks 110 or directly to each other. Additionally, in some implementation, there may be thousands, hundreds of thousands, or more, of the user devices 104 and the merchant devices 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user devices 104, the merchant devices 108, and the computing device(s) 112 may communicatively couple to the network(s) 110 in any manner, such as by a wired or wireless connection. The network (s) 110 may also facilitate communication between the user devices 104, the merchant devices 108, and the computing device(s) 112.

In addition, and as mentioned previously, the computing device(s) 112 may include the one or more processor(s) 132 and the computer-readable media 134. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 132 and the computer-readable media 134 of the computing device(s) 112 may be the same as, similar to, or different from the processor(s) 114 and the computer-readable media 116, respectively, of the user device(s) 104. As discussed above, the computer-readable media 134 may store the user interaction module 136, the merchant interaction module 138, the appointment and payment module 140, the natural language processing module 142 and the database 144. The database 144 may store various information including appointment information 146 of the merchants, customer information 148, and customer interaction history information 150.

The user interaction module 136 and merchant interaction module 138 operate to interface with the user devices 104 and merchant devices 108, respectively. For example, the modules 136 and 138 may operate in accordance with instructions from the appointment and payment module 140 to request or provide information on behalf of the appointment and payment module 140. The appointment and payment module 140 may handle the creation, modification and the like of appointments and handle the processing of payments related to the appointments. For example, the appointment and payment module 140 may utilize the user interaction module 136 and the merchant interaction module 138 to handle communication with the user 102 and merchant 106, respectively. Communications from the users 102 and/or merchants 106 may be processed using the natural language processing module 142. In addition, the appointment and payment module 140 may utilize information from the database 144, such as the appointment information 146 of the merchants, the customer information 148, and the customer interaction history information 150 to provide handling of appointments and payments between merchants and users. In some implementations, the customer information 148 may include information regarding electronic payment accounts of the customers (e.g. users 102).

As mentioned above, the appointment and payment module 140 may handle payments between merchants and users. When paying for a transaction, a user 102 can provide the amount of payment that is due to a merchant 106 using cash, check, a payment card, NFC, or by electronic payment through a payment service of the computing devices 112. The merchant 106 can interact with the merchant device 108 to process the transaction. In some examples, the service of the computing devise 112 may handle appointments but payments may at least at times be handled by point of sale (POS) transactions. In such cases, the point of sale may be the place where the user 102 with user device 104 meets merchant 106 with merchant device 108 at the appointment time. During point-of-sale (POS) transactions, the merchant device 108 can determine and send data describing the transactions, including, for example, appointment data, services related to and/or provided as a part of the appointment, item(s) being purchased in connection with the appointment, the amount of the item(s), buyer information, and so forth.

In some implementations, the payment service enables card-less payments, i.e., electronic payments, for transactions between the users 102 and the merchants 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing devices 112 for an electronic payment account. As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 typically creates a user account with the service of the computing devices 112. The user 102 can create the user account, for example, by interacting with an application of the user device 104 that is configured to perform electronic payment transactions and that may execute on the user device 104. When creating an electronic payment account with the service of the computing devices 112, the user 102 may provide an image including the face of the user, data describing a financial account of the user 102 (e.g., a credit card number, expiration date), and a billing address. This user information can be securely stored by the computing devices 112, for example, in the customer information 148 in the database 144. Further, the customer interaction history information 150 may be created for each user 102, which may include information about the user and transactions conducted by the user.

To accept electronic payments for POS transactions, the merchant 106 may create a merchant account with the service of the computing devices by providing information describing the merchant including, for example, a merchant name, contact information, e.g., telephone numbers, the merchant's geographic location address, and one or more financial accounts to which funds collected from users will be deposited. This merchant information can be securely stored by the service, for example, in the database 144 along with the appointment information 146. Further, a merchant profile may be created for each merchant, which may include information about the merchant and transactions conducted by the merchant.

The service of the computing devices 112 may be configured to enable electronic payments for transactions. The computing devices 112 can include one or more servers that are configured to perform securely electronic financial transactions, e.g., electronic payments for transactions between a user and a merchant, for example, through data communicated between the user device 104 and the merchant device 108. Generally, when a user and a merchant enter into an electronic payment transaction, the transaction is processed by electronically transferring funds from a financial account associated with the user account to a financial account associated with the merchant account.

The appointment and payment module 140 may be configured to send and receive data to and from the user device 104 and the merchant device 108. For example, the appointment and payment module 140 can be configured to send information describing merchants to an application on the user device 104 using, for example, the information stored in the database 144. For example, the appointment and payment module 140 can communicate data describing merchants 106 that are within a threshold geographic distance from a geographic location of the user device 104. The data describing the merchants 106 can include, for example, a merchant name, geographic location, contact information, and an electronic catalogue, e.g., a menu that describes appointments that are available for scheduling with the merchant.

In some embodiments, the appointment and payment module 140 is configured to determine whether a geographic location of the user device 104 is within a threshold geographic distance from a geographic location of the merchant device 108. The appointment and payment module 140 can determine a geographic location of the user device 104 using, for example, geolocation data provided by the user device 104. Similarly, the appointment and payment module 140 can determine a geographic location of the merchant device 108 using, for example, geolocation data provided by the merchant device 108 or using a geographic address, e.g., street address, provided by the merchant. Depending on the implementation, the threshold geographic distance can be specified by the appointment and payment module 140, by the user, or by the merchant.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geofence, or determining whether the user device 104 can communicate with the merchant device 108 using a specified wireless technology, e.g., Bluetooth® or Bluetooth® low energy (BLE). In some embodiments, the appointment and payment module 140 restricts electronic payment transactions between the user 102 and the merchant 106 to situations where the geographic location of the user device 104 is within a threshold geographic distance from a geographic location of the merchant device 108.

The computing devices 112 can also be configured to communicate with one or more computing devices 152 of a card payment network (e.g., MasterCard®, VISA®) over the one or more networks 110 to conduct financial transactions electronically. The computing devices 112 can also communicate with one or more bank computing devices 154 of one or more banks over the one or more networks 110. For example, the computing devices 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card instead of a credit card, in which case, the bank computing device(s) of a bank corresponding to the debit card may receive communications regarding a transaction in which the user is participating. Additionally, there may be computing devices of other financial institutions involved in some types of transactions or in alternative system architectures, and thus, the foregoing are merely several examples for discussion purposes.

The user 102 operating the user device 104 that is within a threshold geographic distance of the merchant device 108 can interact with an application executed on the user device 104 to conduct an electronic payment transaction with the merchant 106. While interacting with the application, the user 102 can select the merchant 106, from a listing of merchants 106, with whom the user wants to enter into an electronic payment transaction. The user 102 can select the merchant 106, for example, by selecting a "check in" option associated with the merchant 106. The user device 104 can communicate data to the computing devices 112 indicating that the user 102 has checked in with the merchant 106. In response, the computing devices 112 can communicate data to notify the merchant device 106 that the user has checked in. An application executing on the merchant device 108 can notify the merchant 106 that the user has electronically checked in with the merchant 106 through a display of the merchant device 108.

Once checked in, the user 102 can receive, obtain or request items, services or appointments that are available to be acquired from the merchant 106. When the user 102 is ready to enter into the card-less payment transaction, the user 102 can, for example, approach a point of sale for the merchant 106 and identify him or herself. For example, the user 102 can verbally notify the merchant 106 that the user 102 wants to enter into a card-less payment transaction and can provide the merchant 106 with the user's name. The merchant 106 can then interact with the application executing on the merchant's device to select the user 102, from a listing of users that have checked in with the merchant 106, to initiate an electronic payment transaction for the item(s) being acquired by the user 102. For example, the merchant 106 can determine a total amount to charge the user for the item(s) being acquired. The user can verbally approve the total amount to be paid and, in response, the merchant 106 can submit a request for an electronic payment transaction for the total amount of the transaction to the computing devices 112. In response, the computing devices 112 can obtain, for example, from the customer information 148, data describing a financial account associated with the electronic purchase account of the user 102 to which the total amount will be charged.

The computing devices 112 can then communicate with the computing device 152 of a card payment network to complete an electronic payment transaction for the total amount to be charged to user's electronic payment account. Once the electronic payment transaction is complete, the computing devices 112 can communicate data describing the electronic payment for the transaction to the user device 104, e.g., as an electronic receipt, which can, for example, notify the user 102 of the total amount charged to the user for the electronic payment for the transaction with the particular merchant. Further, while a mobile user device 104 is described in this example for purposes of explanation, additional or alternative types of devices may be used in other examples.

In addition, the payment service implemented by the appointment and payment module 140 of the computing devices 112 may operate to perform payment processing in a similar manner to that described above based on the appointments, for example, without requiring interaction of the merchant or the user. Such an example payment process is described below.

The payment service may store appointment information including identification of the merchant 106, the merchant device 108 of the merchant 106, the user 102, the user device 104 of the user 102, services and/or items associated with the appointment, a location of the appointment, a time of the appointment, and so on. At the time of an appointment, the payment service may request information from the user device 104 and/or the merchant device 108 to determine whether the user device 104 is within a threshold geographic distance of the merchant device 108 or the location of the appointment. Alternatively, the user device 104 and/or the merchant device 108 may be instructed to make the distance determination. Based on the distance determination, the payment service may "check-in" the user with the merchant for the appointment (e.g. when the user device 104 is within the threshold geographic distance of the merchant device 108 or the location of the appointment). Application(s) executing on one or more of the user device 104 and the merchant device 108 can notify the user 102 and/or merchant 106 that the user 102 has been electronically checked in with the merchant 106 by the payment service.

Once checked in, the user 102 can receive, obtain, or request the items or services associated with the appointment. Subsequently, the computing devices 112 may determine that the appointment has been completed and may conduct an electronic payment transaction between the user 102 and the merchant 106. For example, the computing devices 112 may determine the end of an appointment based on a determination that the user device 104 has left the geographic threshold distance from the merchant device 108 or the location of the appointment or a scheduled end time of the appointment. The computing devices 112 may then communicate with the computing device 152 of a card payment network to complete an electronic payment transaction for the total amount to be charged to user's electronic payment account and credited to, for example, an account of the merchant 106. Once the electronic payment transaction is complete, the computing devices 112 can communicate data describing the electronic payment for the transaction to the user device 104 and the merchant device 108, e.g., as an electronic receipt, which can, for example, notify the user 102 and merchant 106 of the total amount charged to the user for the electronic payment for the transaction with the merchant.

Additional details and example functionalities of the appointment and payment module 140 and the computing devices 112 as a whole are discussed below with regard to FIGS. 2-9.

As mentioned above, the operations of modules 136-144 may vary depending on functionality provided by the particular implementation. As such, the implementations are not limited to the example provided above. Details of the operation of the computing devices 112 is provided in the below discussion of FIGS. 2-9. Further, the example processes are described in the context of the environment of FIG. 1 but are not limited to those environments. Each process described in this disclosure is illustrated as a logical flow graph, each operation of which represents a sequence of operations that can be implemented in hardware, software, or a combination thereof. In the context of software, the operations represent computer-executable instructions stored on one or more computer-readable media or embodied as one or more computer transmission media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In some implementations, the computer transmission media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Prior to providing a detailed discussion of the acts involved in the processes 200-900, an example scenario may be provided to give context. These scenarios are merely examples and should not be construed as limiting the implementations.

Figure 2:
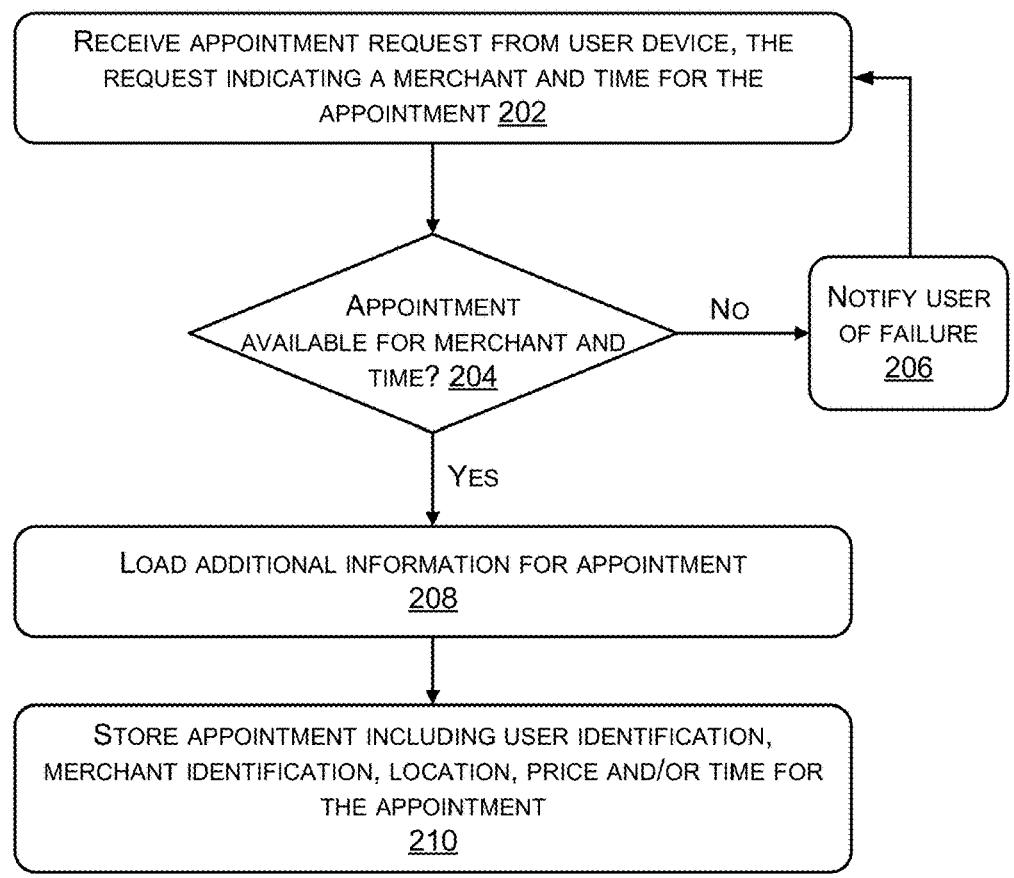
FIG. 2 is a flow diagram illustrating an example process the handling of appointment creation in the system shown in FIG. 1.

FIG. 2 is a flow diagram illustrating an example process 200 for the handling of appointment creation in the system shown in FIG. 1. The following actions described with respect to FIG. 2 may be performed by the computing devices 112 shown in FIG. 1.

For context, process 200 may be utilized in the following scenario. A user (e.g. a customer) may wish to book an appointment with a merchant 106. To do so, the user may utilize the appointment interface module 120. For example, the user may indicate the merchant, type of service and time the user desires using a user interface provided by the appointment interface module 120. The following acts of process 200 may be performed to process the received appointment request.

At 202, the user interaction module 136 of the computing devices 112 may receive an appointment request from a user device 104. In some implementations, the appointment request may indicate a merchant (e.g. a merchant identifier), a time for the appointment and so on.

At 204, the appointment and payment module 140 may utilize the appointment information 146 of the merchant stored in the database 144 to determine if the appointment is available for the merchant at the indicated time. If the appointment is not available, the process may continue to 206. At 206, the appointment and payment module 140 may notify the user that the appointment is unavailable. If the appointment is available, the process may continue to 208.

At 208, the appointment and payment module 140 may load additional information for the appointment, such as the location, price, and so on for the appointment. At 210, the appointment and payment module 140 may generate and store an appointment record for the new appointment including user identification, merchant identification, a location, a price and/or a time for the appointment.

The process 200 described above is only an example provided for discussion purposes. Numerous other variations are possible.

Figure 3:
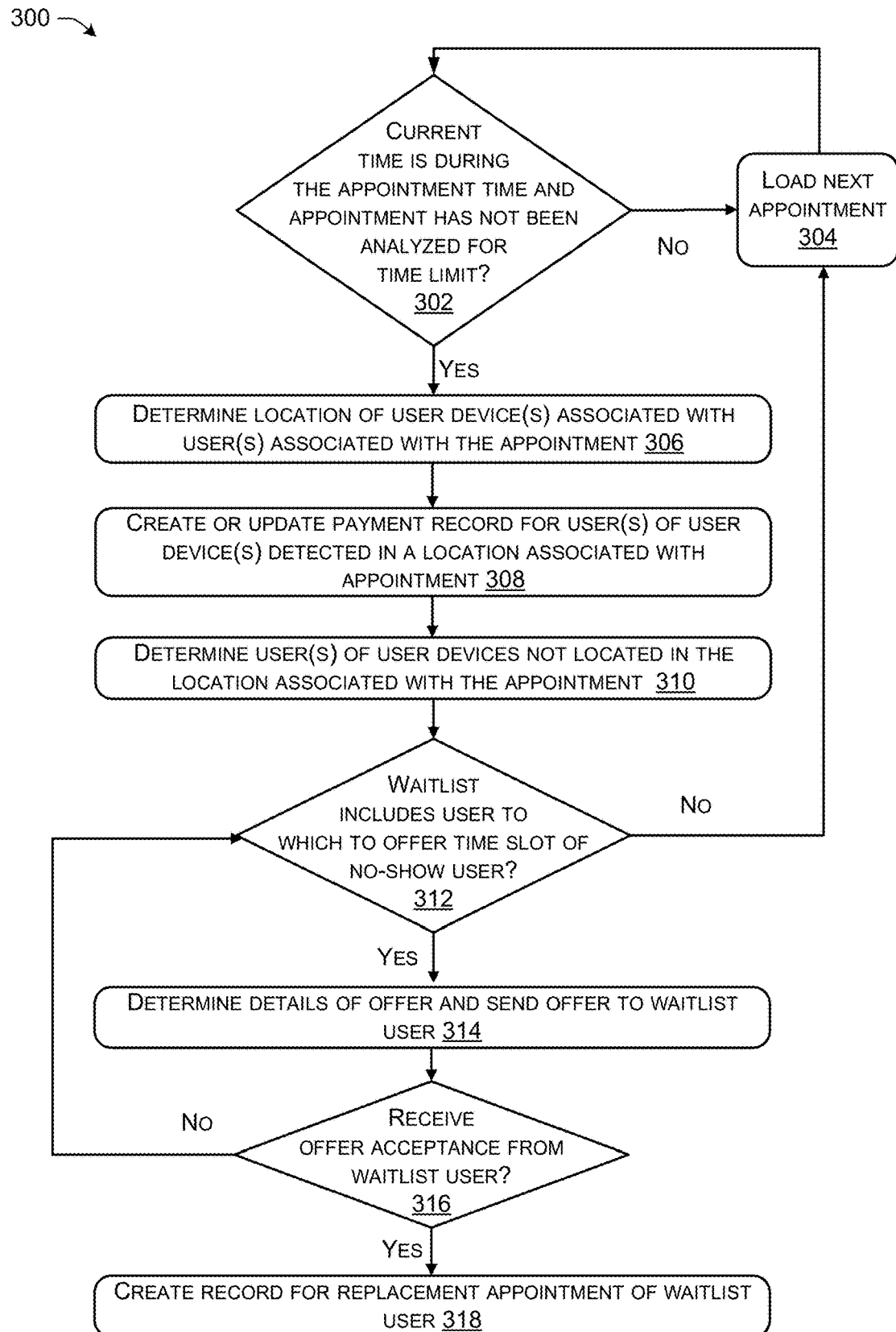
FIG. 3 is a flow diagram illustrating an example process for handling payments from users to merchants based at least in part on appointments and customer locations in the system shown in FIG. 1.

FIG. 3 is a flow diagram illustrating an example process 300 for handling payments from users (or customers) to merchants based at least in part on the appointments and customer locations. For instance, the process of FIG. 3 may, if a customer is present at a location associated with the appointment at a time associated with the appointment, create a payment record (i.e. a billing item) for the customer. The process of FIG. 3 may further provide for maximizing the number of completed appointments by scheduling new customers when previously made appointments are missed or canceled. The following actions described with respect to FIG. 3 may be performed by the computing devices 112 shown in FIG. 1.

For context, process 300 may be utilized in the following scenario. A yoga instructor is offering classes in the park. Customers of the yoga instructor may create appointments for the classes using the process described above with regard FIG. 2. The yoga instructor may instruct the computing devices 112 to handle payment processing automatically for customers having appointments that are present during the appointment time. Further, the process 300 may provide for inviting new customers to classes to replace "no-show" customers.

At 302, the computing device(s) 112 determines if the current time is during a time associated with an appointment being analyzed and that the current appointment has not been analyzed for longer than a threshold amount of time. In some implementations, the threshold amount of time may be used to limit the frequency that the appointments are checked to a desired frequency level (e.g. once per minute or less, once per ten minutes or less, etc.). If not, the process continues to 304, at which point, a next appointment is loaded. If so, the process continues to 306.

At 306, the appointment and payment module 140 may utilize the user interaction module 136 to query the location module 122 of the user devices of users associated with the appointment being analyzed. Though not shown, the location module 122 of the user devices 104 may utilize one or more known location techniques such as proximity to a Bluetooth low energy device (e.g. of a merchant device or of a device located in a known location), global positioning system data, geolocation data, cell tower location data, wireless access point location data, wireless beacon location data, and so forth At 308, the appointment and payment module 142 may add or update a payment record for users of the user devices that are detected in the location associated with the appointment. For instance, the techniques herein may include determining if a customer is present at a location associated with the appointment and creating a payment record (i.e. a billing item) for the customer for the service associated with the appointment. Such a payment transaction may be processed as described above with regard to FIG. 1.

At 310, the appointment and payment module 140 may determine the users 102 associated with the appointment that are not located in the location associated with the appointment (i.e. no-shows). At 312, the appointment and payment module 140 may choose the next customer listed in a waitlist included in the appointment information 150 to which to offer the appointment of the no-show user. Though the implementation discussed herein utilizes a waitlist, in some implementations, the appointment and payment module 140 may ascertain the customers that appears most likely to accept the appointment and may or may not rely on a waitlist. Such a determination may be made based on many factors such as distance between the customers' current location and the location of the appointment, scheduling information of the customer and/or customer interaction history information. For example, the appointment and payment module 140 may determine that customers whose current location is within walking distance of the location of the appointment to be more likely to accept the appointment than customers outside walking distance. In another example, the appointment and payment module 140 may eliminate from consideration customers whose scheduling information indicates that the customer is busy or will be busy before an estimated end of the appointment (e.g. the customer may have another appointment in thirty (30) minutes where the desired service, e.g. a haircut, is estimated to take forty-five (45) minutes). Additionally, depending on various settings of the system or preferences of the merchant, the appointment and payment module 140 may utilize customer interaction history information and determine the customer to offer the appointment based on past interaction between the respective customers and the merchant. More particularly, the settings or preferences may cause the appointment and payment module 140 to offer appointments of no-show customers to other customers having some threshold level of past interaction with the merchant, e.g. at least three prior visits. Alternatively, in some examples, the settings or preferences may indicate that appointments of no-show customers should be offered to customers with no prior interaction with the merchant (e.g. new customers). These are merely examples and many variations would be apparent in view of this disclosure.

At 314, the appointment and payment module 140 may determine details of the offer of the appointment (e.g., whether a discount should be offered) and send the determined offer to the waitlist user.

At 316, the appointment and payment module 140 determines if an acceptance has been received from the wait list user. If so, the process moves to 318 and a record for the replacement appointment is recorded for the waitlist user. If no acceptance is received or the waitlist user declines the appointment, the process returns to 312 and a different waitlist user is selected (if possible).

The process 300 described above is only an example provided for discussion purposes. For example, the implementation discussed above queries device locations during the appointment times. In other implementations, the "trigger" for the payment processing may be user device generated in a push manner. For example, the user device 104 may push a notification to the computing device(s) 112 indicating that the user device 104 has entered a geolocation associated with an appointment of the user 102. In addition, the user device 104 may push a notification to the computing device(s) 112 indicating that the user device 104 has exited the geolocation. The pushed notifications may trigger the process to create payment records for the appointments. Numerous other variations are possible.

Figure 4:
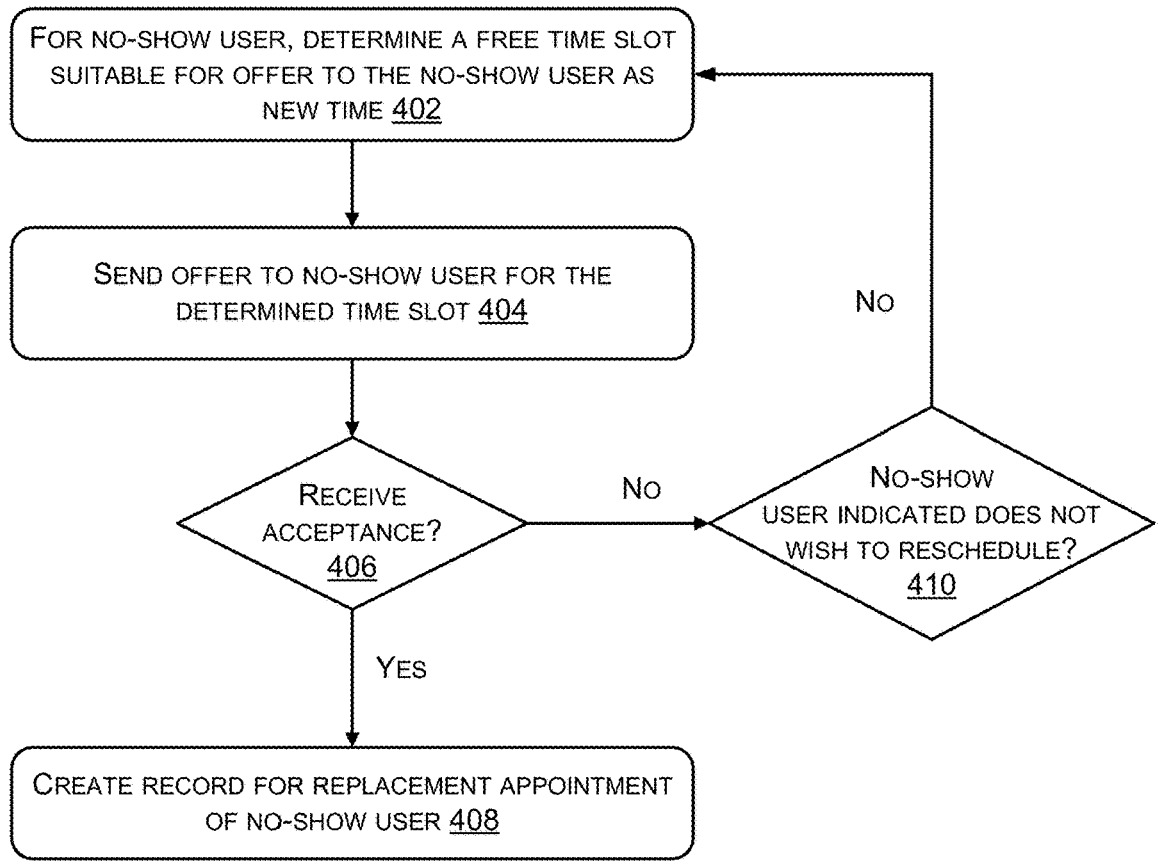
FIG. 4 is a flow diagram illustrating an example process for handling the rescheduling of a no-show customer on behalf of a merchant in the system shown in FIG. 1.

FIG. 4 is a flow diagram illustrating an example process 400 for handling the rescheduling of a no-show user for a merchant. The following actions described with respect to FIG. 4 may be performed by the computing device 112 as shown in FIG. 1 and may follow or be performed in relation to the process 300.

For context, process 400 may be utilized in the scenario described above with regard to FIG. 3. One or more users have been determined by process 300 to be "no-shows" of the yoga instructor based on the appointment times of the users with a merchant and the geolocation of the users. The following acts of process 400 may be performed to offer the no-show user(s) new appointments with minimal interaction from the merchant.

At 402, for a no-show user, the appointment and payment module 140 determines if the merchant has a free appointment time slot suitable to offer to the no-show user. Such a determination may be made based on many factors such as distance between the no-show user's current location and the location of the appointment, the customer task list or calendar and/or customer interaction history information. For example, if the no-show user is one hundred (100) miles away, a free appointment slot one hour from the current time is unlikely to be suitable. In another example, the appointment and payment module 140 may eliminate from consideration appointment slots where the customer's customer task list or calendar indicates that the customer is busy or will be busy before an estimated end of the appointment (e.g. the customer may have another appointment in thirty (30) minutes where the desired service, e.g. a haircut, is estimated to take forty-five (45) minutes). As mentioned above, the appointment and payment module 140 may analyze the customer's past interactions with the merchant (or other merchants) to determine whether the customer is likely to be interested in particular appointment slots. For example, the appointment and payment module 140 may determine that the customer rarely, if ever, has any grooming services provided between the hours of 4:00 PM and 7:00 AM. As such, the appointment and payment module 140 may treat free appointment slots in the determined time period as unlikely to be suitable to the customer.

At 404, the appointment and payment module 140 may send the no-show customers an offer of the determined free time slot as a replacement appointment. The offer may indicate to the user that the user may accept the time slot, reject the time slot or indicate that the user does not wish to reschedule the appointment at this time.

At 406, the appointment and payment module 140 determines if the user accepted the offered rescheduled appointment. If so, the process moves to 408 and the appointment and payment module 140 creates an appointment record for the replacement appointment of the no-show user. Otherwise, the process moves to 410. At 410, the appointment and payment module 140 determines if the user indicated that the user did not wish to reschedule at this time. If so, the process 400 ends. Otherwise, the process returns to 402 and a different free time slot, if available, is selected to be offered to the user.

The process 400 described above is only an example provided for discussion purposes. Numerous other variations are possible.

Figure 5:
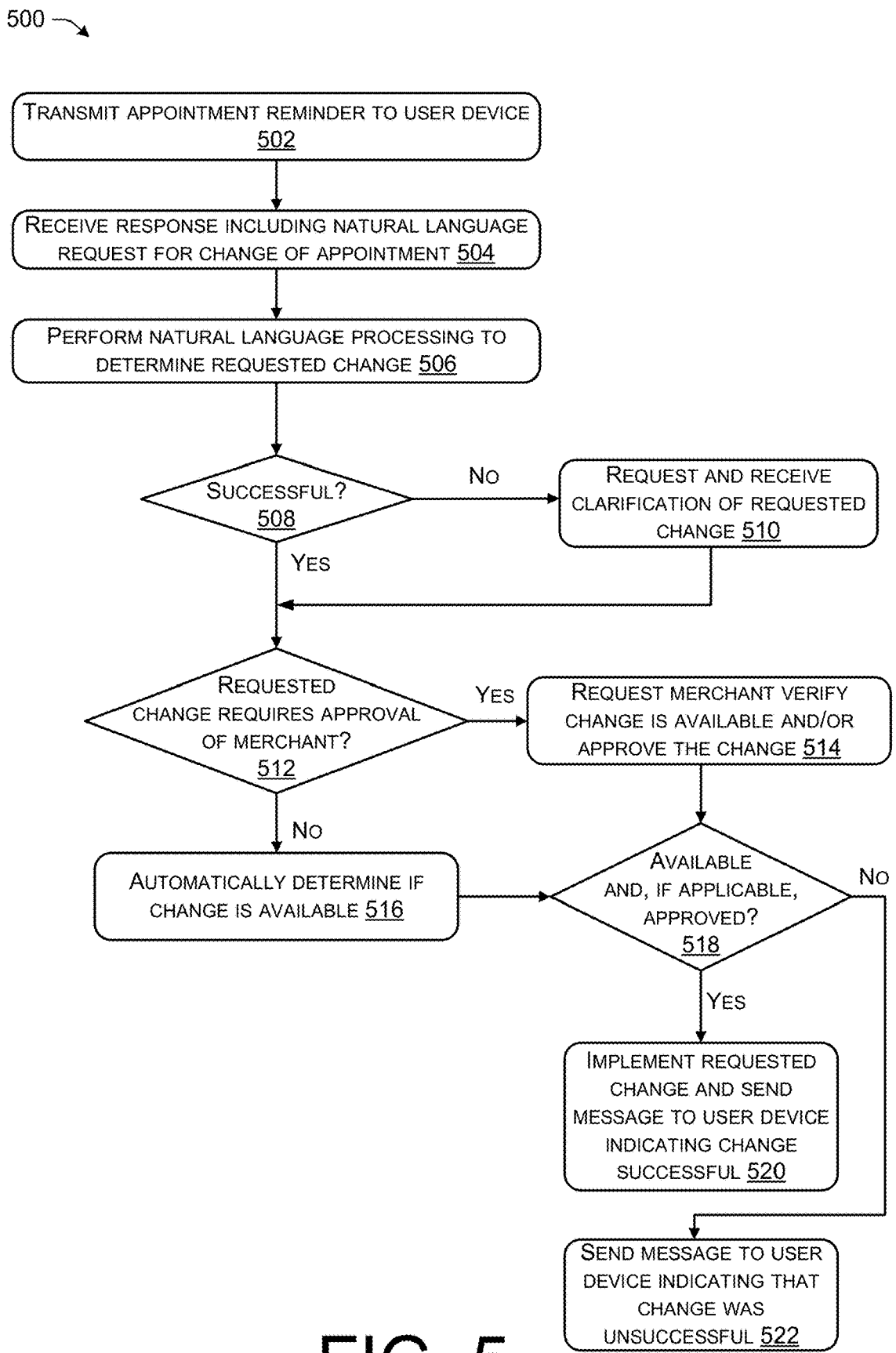
FIG. 5 is a flow diagram illustrating an example process for handling change requests to existing appointments in the system shown in FIG. 1.

FIG. 5 is a flow diagram illustrating an example process 500 for handling change requests to existing appointments. The following actions described with respect to FIG. 5 may be performed by the computing device 112 as shown in FIG. 1.

For context, process 500 may be utilized in the above described scenario in which four users have a reservation with a restaurant merchant with a previously set up bill splitting arrangement. The users now desire to add two additional users to the reservation and modify the bill splitting arrangement accordingly. The following acts of process 500 may be performed to modify an existing appointment.

At 502, the appointment and payment module 140 may cause the user interaction module 136 to transmit an appointment reminder to the user device(s) 104 of the user(s) 102 associated with an appointment. At 504, the appointment and payment module 140 may receive a response to the reminder that may include a natural language request for one or more changes to the appointment. In some implementations, the natural language request may take the form of natural language text data (e.g. SMS, e-mail, instant message, etc.), voice data, handwritten data, and so on. At 506, the appointment and payment module 140 may request the natural language processing module 142 perform natural language processing on the received request to determine if a requested change is present in the response, and, if so, what requested change is present.

At 508, the appointment and payment module 140 may determine if the natural language processing was successful. If not, the process may continue to 510. Otherwise, the process may continue to 512.

At 510, the appointment and payment module 140 may request and receive clarification of the requested change. This may be performed in various ways. For example, in some implementations, the appointment and payment module 140 may request clarification from the originating user. In some implementations, if portions of the change requests were recognized by the natural language processing, the clarification request may be customized to reflect to the recognized portions. For example, if the natural language processing recognizes that the originating user wishes to add one or more additional users but is unable to determine who the additional user(s) are, the clarification request may include a query such as, "Who would you like to add?" In other implementations, the clarification of requests may take the form of manual recognition assistance (e.g. human review of the change request). The manual human review may be requested and received from the originating user, merchant, a third-party or so on. Once the clarification is received, the process continues to 512.

At 512, the appointment and payment module 140 determines if the requested change requires approval from the merchant. If so, the process continues to 514. If merchant approval is not required, the process continues to 516. The determination of whether approval from the merchant is required may be based on various types of information depending on the implementation. For example, in some implementations the appointment records may include indications of what changes should be approved by the merchant and what changes may be automatic. Alternatively or additionally, such rules may be included in the database separate from the appointments. For example, in the above scenario, previously established rules may set forth that the addition of new users to the reservation may require merchant approval but modifications to the bill splitting arrangement do not require merchant approval. In other scenarios, the change may not need merchant approval because the change does not affect the merchant. For example, the payments may be handled by the computing device(s) 112. In a particular example, the computing device(s) 112 may be part of a payment processing system that acts as an intermediary to the merchant-customer transaction. In such a scenario, the customers may have accounts with the payment processing system and the payment processing system may have been previously informed of the payment sources for the customers. Because the payment processing system is handling the charges, the payment processing system may verify the change in bill splitting without the merchant's involvement.

At 514, the appointment and payment module 140 may instruct the merchant interaction module 138 to send an approval request to the merchant that may request the merchant verify the change is available and that the merchant approves of the change. The process then continues to 518.

At 516, the appointment and payment module 140 may determine automatically if the change is available. For example, a modification of the bill splitting arrangement may not require approval from the merchant and the appointment and payment module 140 may make the determination automatically. In another scenario, if the change request is for a modification to the time at which the user has an appointment for a haircut at a salon and the salon in question allows for automatic approval of time changes based on scheduling information of the merchant, the appointment and payment module 140 may determine if the time slot requested in the change request is available based on the appointment information 146. Once the appointment and payment module 140 has determined if the change is available, the process continues to 518.

At 518, if the change requested is available and, if applicable, approved, the process continues to 520. At 520, the appointment and payment module 140 may implement the change to the appointment record stored in the appointment information 146. Otherwise, the process continues to 522. At 522, the appointment and payment module 140 may send a message to the user indicating that the change was unsuccessful.

The process 500 described above is only an example provided for discussion purposes. Numerous other variations are possible.

Figure 6:
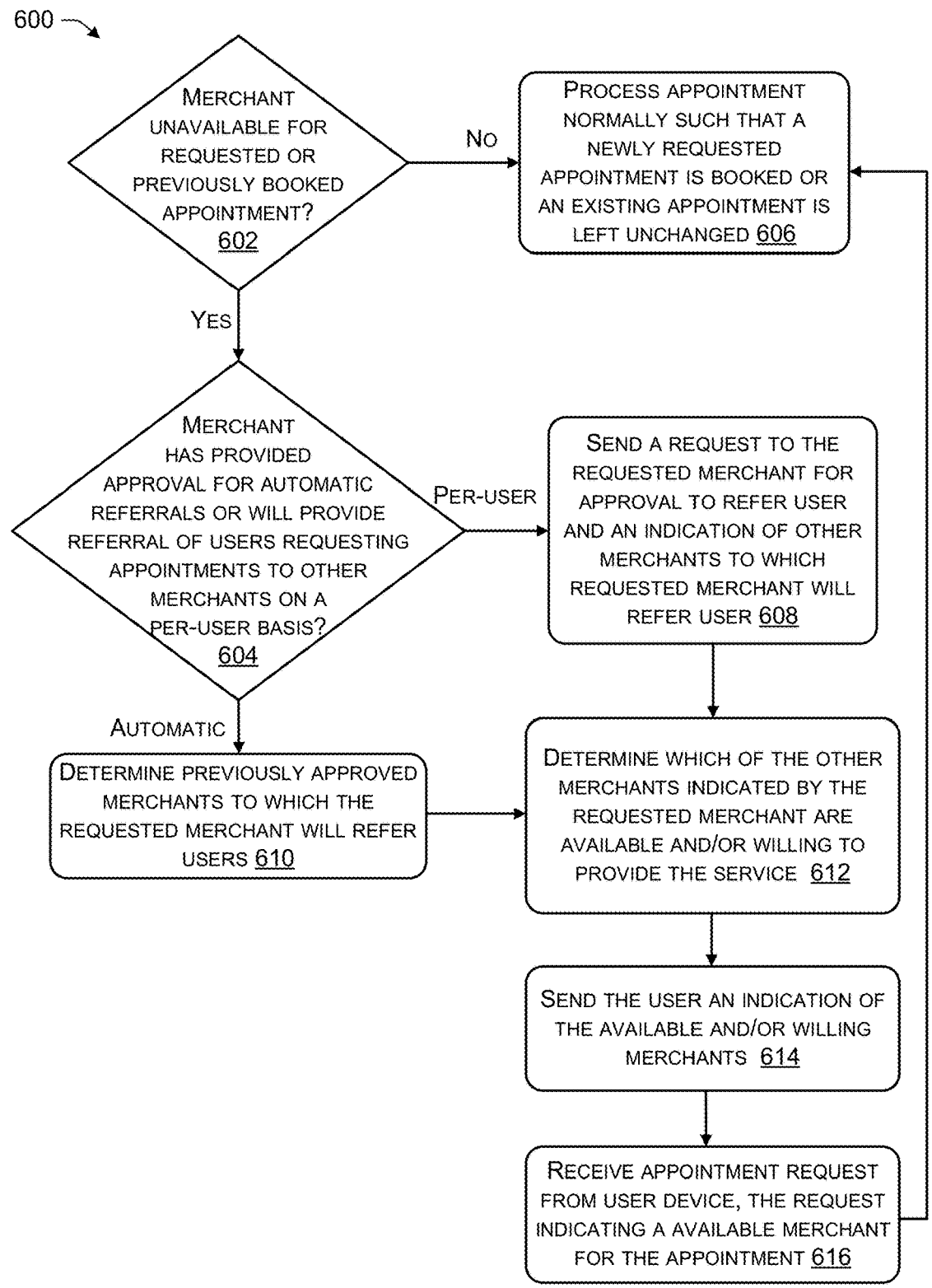
FIG. 6 is a flow diagram illustrating an example process in the system shown in FIG. 1 for handling referrals of appointments from an initial, requested merchant to merchants recommended by the requested merchant. The appointments to be referred may be pre-existing or newly requested appointments.

FIG. 6 is a flow diagram illustrating an example process 600 for handling referrals of appointments from an initial, requested merchant to other merchants recommended, endorsed, or trusted by the requested merchant. The appointments to be referred may be pre-existing or newly requested appointments. The following actions described with respect to FIG. 6 may be performed by the computing device(s) 112 shown in FIG. 1.

At 602, the computing devices 112 may determine if the merchant is unavailable for a newly requested or a previously booked appointment. For example, a merchant may send a status update message to the computing device(s) 112 indicating that the merchant is sick and requesting the computing device(s) 112 refer the merchant's appointments for the day to other merchants. In another scenario, an appointment request may be received for a time slot during which the merchant has indicated the merchant will be out of town, for which the merchant is already booked or for a service that the merchant does not offer. If the merchant is determined to be unavailable for the appointment, the process 600 may continue to 604. Otherwise, the process 600 continues to 606 and the appointment is processed normally such that the newly requested appointment is booked or the existing appointment is left unchanged.

At 604, the computing devices 112 may determine if the merchant has provided for approval of automatic referrals (and/or has already set up a referral list of other merchants) or if the merchant will provide referral of users requesting appointments to other merchants on a per-user basis. If the computing devices 112 determine the merchant will approve and/or handle referrals on a per-user basis, the process 600 continues to block 608. Otherwise, the process 600 proceeds to blocks 610.

At 608, the appointment and payment module 140 may send a request to the requested merchant for approval to refer the user to another merchant and for an indication of other merchants to which the requested merchant will refer users. At 610, the appointment and payment module 140 may determine merchants that were previously approved by the requested merchant as merchants to which the requested merchant will refer users. For example, the requested merchant may have previously provided the computing devices 112 with a list of approved merchants for referrals. The level of detail at which the merchant may specify which merchants to refer the users to may vary from implementation to implementation. For example, the system may provide for specifying the referral merchants based on type of service, user categories (e.g. new customers or established customers), and so on. Following 608 or 610, the process continues to 612.

At 612, the appointment and payment module 140 may determine which of the merchants approved for referrals by the requested merchant are available and/or willing to provide the service of the appointment to be referred. This may be done by analyzing the appointment information 146 stored in the database 144 to determine open appointment times. Alternatively or in addition, the other merchants may be queried to see if they would be willing to accept the referred task.

At 614, the appointment and payment module 140 may send the user an indication of the available and/or willing other merchants. The indication sent to the user may, in some examples, explicitly indicate that the requested merchant recommends, endorses, or trusts the available and/or willing other merchants. Moreover, in some implementations, the user may be presented with a ranked list of the available and/or willing merchants. The merchants may be ranked on various factors such as availability, price, reviews, and so on. At 616, the appointment and payment module 140 may receive an appointment request from the user device, the request indicating an available merchant for the appointment. The process 600 may then proceed to 606 and process the replacement appointment request normally. Though not shown, in some implementations, the system may provide for communication between the selected other merchant and the initially requested merchant. This communication may allow for the initially requested merchant to provide the selected other merchant with known information about the user, such as history, likes and dislikes, the desired service, and the like.

The process 600 described above is only an example provided for discussion purposes. For example, some implementations may include a merchant to merchant financial agreement or the like. More particularly, the system may include functionality to allow for referral bonuses, fee sharing arrangements or the like between the merchants. In another example variation, the system may provide suggested lists of other merchants for the requested merchant to select for possible referrals. Such a suggested list may be generated based on various types of information, such as the requested merchant's referral history, connections on a social web-site and so on. Numerous other variations are possible.

Figure 7:
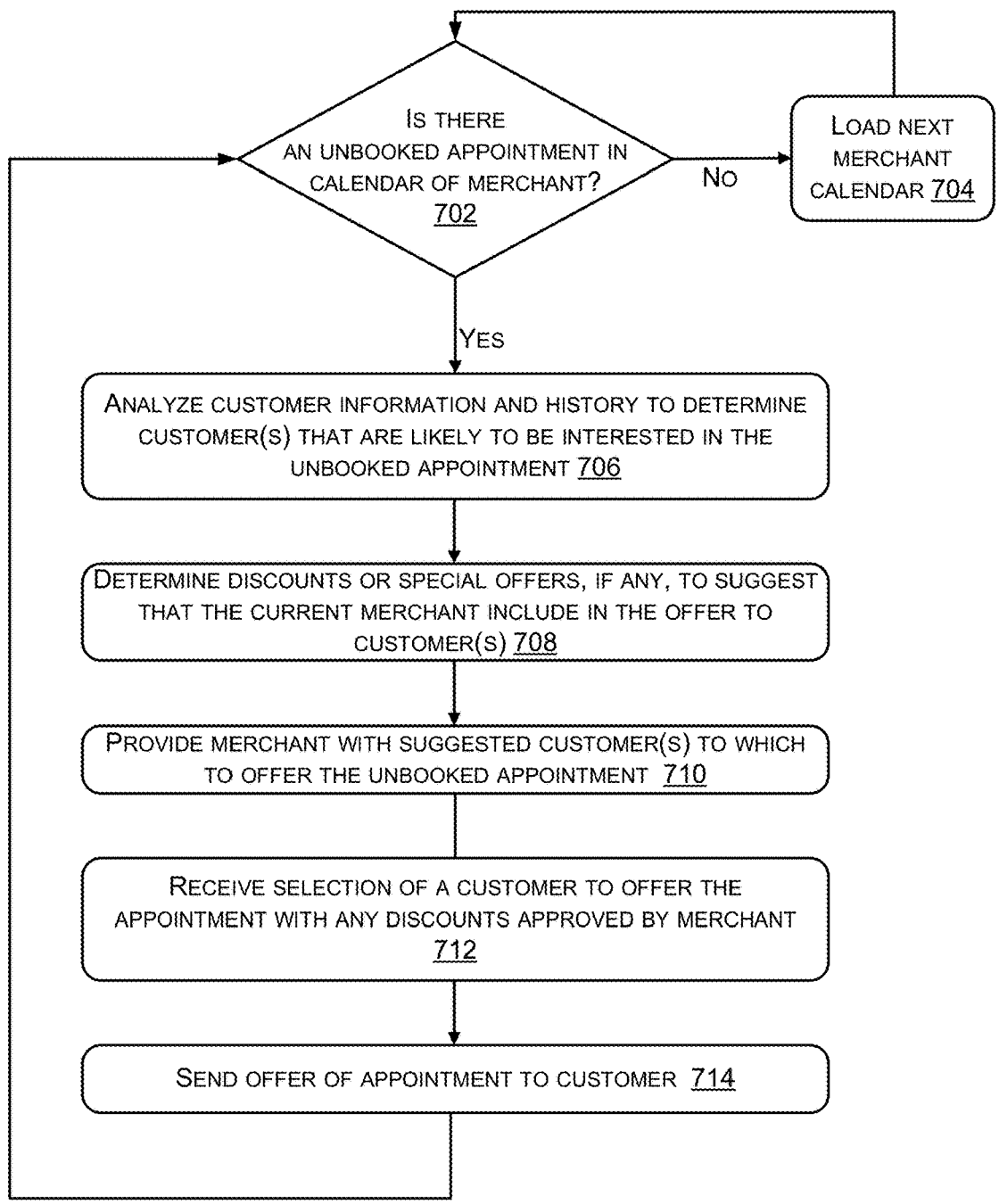
FIG. 7 is a flow diagram illustrating an example process in the system shown in FIG. 1 for providing suggestions to merchants of potential customers to which to offer unbooked appointment slots.

FIG. 7 is a flow diagram illustrating an example process 700 for providing suggestions to merchants of potential customers to which to offer unbooked appointment slots. The following actions described with respect to FIG. 7 may be performed by the computing device(s) 112 shown in FIG. 1.

At 702, the appointment and payment module 140 analyzes a merchant's appointments to determine if there is an unbooked appointment in the merchant's schedule. If not, the process 700 continues to 704 and the appointment and payment module 140 begins analyzing the next merchant's schedule. If an unbooked time slot is found, the process moves to 706. Depending on the implementation, the time range of the merchant's schedule being analyzed may vary. For example, the time range may be the immediate future (e.g. the next few appointment slots or the next few hours) or the range could be more extensive (e.g. the next few business days, months or years). In addition, the appointment and payment module 140 may determine types of vacancies in the merchant's schedule and treat the various types of vacancies differently. For example, the merchant may indicate that regularly vacant slots (e.g. fifty percent of weeks at 1:30 PM) be offered to new customers at a substantial discount but that regularly booked slots be offered to new or existing customer at a lesser discount or no discount.

At 706, the appointment and payment module 140 analyzes customer information 148 and customer interaction history information 150 to determine customer(s) that are likely to be interested in the unbooked appointment. For example, the customer information 148 may include customers' calendars or other preferences the customer has indicated for getting a certain appointment done. For example, the customer (i.e. a user 102) may maintain a calendar or task list of items to be done in the next couple of weeks (e.g. need to get a haircut done, need to set up time for cake tasting for wedding, etc.). The customer information 148 may include the task lists or calendars of the customers. The appointment and payment module 140 analyzes this information to determine the customer's tasks and availability. Moreover, the appointment and payment module 140 may analyze the customer interaction history information 150 to determine patterns of interaction of the customers with merchants. For example, the customer interaction history information 150 may include information regarding prior transactions between the customers and the merchants. In some examples, the prior transactions may be a collection of the customers' financial transactions with the merchants that have been previously been handled by the appointment and payment module 140. In a particular example, the appointment and payment module 140 may determine that a specific user regularly has a haircut with a merchant every three to four weeks and that it is currently the end of the third week since the user has had a haircut. If the specific user's calendar also indicates that the user is free at the time of the unbooked appointment, the appointment and payment module 140 may determine that the specific user 102 is likely to be interested in the unbooked appointment. In some implementations, the customer information 148 may further include user search histories. The users' search histories (or current search(es)) may be processed to determine what the user is searching for. If the user is searching for services provided by the merchant, the appointment and payment module 140 may determine that the specific user 102 is more likely to be interested in the unbooked appointment.

At 708, the appointment and payment module 140 may determine promotions (e.g. discounts or special offers), if any, to suggest that the merchant include in the offer to the determined customer(s). The determination of the discounts to suggest may be based at least in part on the customer(s)' information, the time remaining until the unbooked appointment slot, and so on. For example, if the appointment is for this afternoon, the appointment and payment module 140 may suggest the merchant offer a 50% discount to the customer(s) while, if the appointment is for next week, the appointment and payment module 140 may suggest that the merchant offer a 20% discount.

At 710, the appointment and payment module 140 may provide the merchant with the suggested users and promotions, if any. At 712, the appointment and payment module 140 may receive a selection from the merchant of a customer to offer the appointment with any discounts approved by merchant. At 714, the appointment and payment module 140 may send the indicated offer for the unbooked appointment to the selected customer. The process may then return to 702.

The process 700 described above is only an example provided for discussion purposes. For example, the above process may be performed in reverse by analyzing the customer information, history and the like to determine services the user is likely to be interested in. The system may then determine unbooked appointments of merchants and suggest the unbooked appointments to the users. In another variation, the appointment and payment module 140 may make offers to the users without interacting with the merchant. For example, instead of presenting the merchant with suggested customers and promotions, the appointment and payment module 140 may create and send the offers to the determined users automatically. Numerous other variations are possible.

Figure 8:
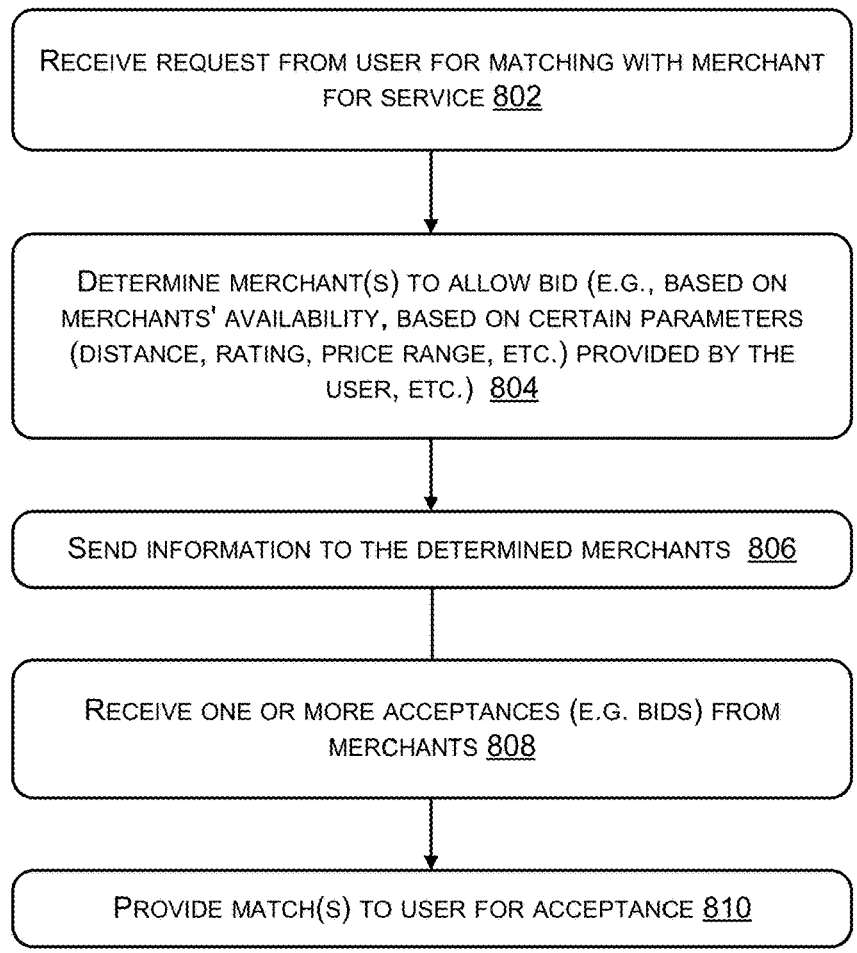
FIG. 8 is a flow diagram illustrating an example process for handling customer requests for services from merchants in the system shown in FIG. 1.

FIG. 8 is a flow diagram illustrating an example process 800 for handling user requests for services from merchants. For example, a user 102 may request the computing devices 112 provide the user with bids or offers from merchants matching one or more parameters that are available to provide a service at some particular time. The following actions described with respect to FIG. 8 may be performed by the computing device(s) 112 shown in FIG. 1.

At 802, the appointment and payment module 140 may receive a request from a user 102 for matching with a merchant that is available to provide a service. At 804, the appointment and payment module 140 may determine one or more merchants to allow to submit "bids" on the request from the user (e.g., based on merchants' availability or desire, based on certain parameters provided by the user (times, distance, rating, price range, etc.), and so on.) At 806, the appointment and payment module 140 may send information to the determined merchants regarding the user's request and requesting the determined merchants submit bids for the service. At 808, the appointment and payment module 140 may receive one or more acceptances (e.g. bids) from the determined merchants. In some implementations, the merchants may be allowed to bid repeatedly for the user's patronage until a cut off time or similar time. At 810, the appointment and payment module 140 may provide the bids to the user for the user's acceptance. In some implementations, the bids may be filtered or ranked and select bids may be offered to the user. If the user accepts any of the bids from the merchants, the resulting appointment may be created in a manner similar to that described above for FIG. 2.

The process 800 described above is only an example provided for discussion purposes. Numerous other variations are possible. An example variation in which the roles of the merchants and users are reversed is illustrated in and described with regard to FIG. 9.

Figure 9:
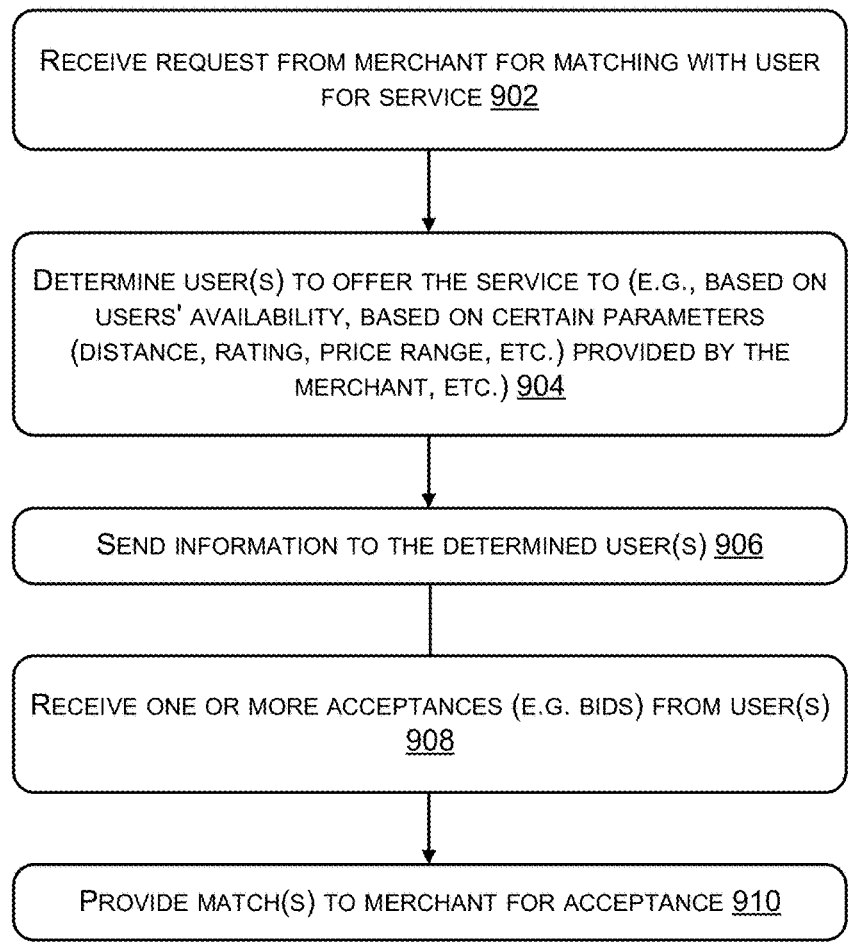
FIG. 9 is a flow diagram illustrating an example process for handling merchant requests for bids for the merchant's services from users in the system shown in FIG. 1.

FIG. 9 is a flow diagram illustrating an example process 900 for handling merchant requests for bids for the merchant's services from users. For example, a merchant may request the computing devices 112 provide the merchant with users matching one or more parameters that desire a service at some particular time. In a particular example, a mobile service provider (e.g. a lawn care service provider) may finish a task early and request the computing device(s) provide the merchant with users that desire lawn care that will take less than forty-five minutes within a radius from the provider's current location. The following actions described with respect to FIG. 9 may be performed by the computing device(s) 112 shown in FIG. 1.

At 902, the appointment and payment module 140 may receive a request from a merchant 106 for matching with a user 102 that desires a service. At 904, the appointment and payment module 140 may determine one or more users to allow to submit "bids" on the request from the merchant (e.g., based on users' availability or desire, based on certain parameters provided by the merchant (time, distance, rating, price range, etc.), the merchant's travel or work itinerary, and so on.) At 906, the appointment and payment module 140 may send information to the determined users regarding the merchant's request and asking the determined users to submit bids for the service. At 908, the appointment and payment module 140 may receive one or more acceptances (e.g. bids) from the determined users. In some implementations, the users may be allowed to bid repeatedly for the merchant's service until a cut off time or similar time. At 910, the appointment and payment module 140 may provide the bids to the merchant for the merchant's acceptance. In some implementations, the bids may be filtered or ranked and select bids may be offered to the merchant. If the merchant accepts any of the bids from the users, the resulting appointment may be created in a manner similar to that described above for FIG. 2.

As previously stated, each of the above discussed scenarios is merely an example and many variations are possible. Moreover, many variations of the techniques discussed above are possible as well without departing from the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   obtaining, by one or more servers of a payment service, appointment data for an appointment between a merchant and a customer, wherein the appointment data indicates at least a customer identity, a merchant identity, a merchant location, a first service to be provided to the customer by the merchant, and a timeslot for the appointment;
   based at least in part on the appointment data, determining, by the one or more servers and during the timeslot, that the customer is at the merchant location during the timeslot;
   responsive to determining that the customer is at the merchant location, creating, by the one or more servers and during the timeslot, a payment record for the appointment, the payment record indicating at least the first service and a cost to be charged by the merchant for the first service;
   receiving, by the one or more servers, an indication of one or more of an item or a second service being acquired by the customer from the merchant during the appointment;
   updating, by the one or more servers, the payment record to an updated payment record indicating at least (i) the first service and (ii) the one or more of the item or the second service;
   determining, by the one or more servers, that the appointment has ended; and
   responsive at least in part to determining that the appointment has ended, sending, by the one or more servers, a request for a payment in an amount that includes the cost for the first service and a cost for the one or more of the item or the second service.

2. The method as claim 1 recites, wherein determining that the appointment has ended comprises determining that a scheduled end time of the appointment has passed.

3. The method as claim 1 recites, wherein determining that the appointment has ended comprises determining that the customer has moved to a new location outside of a threshold distance from the merchant location.

4. The method as claim 3 recites, wherein determining that the customer has moved to the new location is based at least in part on location data associated with a user device associated with the customer, wherein the location data comprises one or more of data indicating proximity to a Bluetooth low energy device, global positioning system data, geolocation data, cell tower location data, wireless access point location data, or wireless beacon location data.

5. The method as claim 3 recites, wherein determining that the customer has moved to the new location is based at least in part on receiving, by the one or more servers, a push notification from a user device associated with the customer.

6. The method as claim 1 recites, wherein determining that the customer is at the merchant location comprises receiving an indication of customer input to a user device associated with the customer indicating that the customer has checked in at the merchant location.

7. The method as claim 6 recites, further comprising responsive to receiving the indication of customer input, causing at least one of the user device or a merchant device associated with the merchant to provide a notification that the customer has checked in at the merchant location.

8. The method as claim 1 recites, wherein receiving the indication of the one or more of the item or the second service comprises receiving transaction data from a merchant device.

9. A system comprising:
   one or more processors; and
   one or more computer-readable media storing instructions that, when executed by the one or more processors, cause the one or more processors to perform operations comprising:
   obtaining appointment data for an appointment between a merchant and a customer, wherein the appointment data indicates at least a customer identity, a merchant identity, a merchant location, and a timeslot for the appointment;
   determining that the customer is at the merchant location during the timeslot;
   responsive to determining that the customer is at the merchant location and based at least in part on the appointment data, creating a payment record for the appointment, the payment record indicating at least a first service to be provided to the customer by the merchant and a cost to be charged by the merchant for the first service;
   receiving an indication of one or more of an item or a second service being acquired by the customer from the merchant during the appointment;
   updating the payment record to include the one or more of the item or the second service;
   determining that the appointment has ended; and
   responsive at least in part to determining that the appointment has ended, sending a request for a payment in an amount that includes the cost for the first service and a cost for the one or more of the item or the second service.

10. The system as claim 9 recites, wherein the request for payment comprises sending a request to complete an electronic payment transaction for the amount to a computing device associated with a card payment network.

11. The system as claim 9 recites, the operations further comprising:
    transmitting, to a user device associated with the customer, an electronic receipt for payment in the amount.

12. The system as claim 9 recites, wherein obtaining the appointment data comprises obtaining the appointment data from a merchant device.

13. The system as claim 9 recites, wherein the appointment data further includes an identifier for a merchant device associated with the merchant and an identifier for a user device associated with the customer.

14. The system as claim 9 recites, wherein the indication received is of an item being acquired by the customer from the merchant during the appointment, and the operations further comprising:
based at least in part on receiving the indication, updating inventory data associated with inventory of the merchant to reflect sale of the item.

15. The system as claim 9 recites, the operations further comprising:
identifying an unbooked appointment block of the merchant based at least in part on a plurality of appointment records associated with the merchant;
identifying one or more customers of the merchant based at least in part on customer records of the merchant and real-time geolocation data indicating that customer devices corresponding to the one or more customers are within a geofence associated with the unbooked appointment block;
causing presentation of, on a display of at least one of the customer devices via an instance of an application executing on the customer device, an offer for the unbooked appointment block;
receiving an indication of acceptance of the offer of the unbooked appointment block via the instance of the application executing on a customer device of the customer; and
based at least in part on determining that the customer has accepted the offer, generating an appointment record,
wherein obtaining the appointment data comprises obtaining the appointment record.

16. A method comprising:
creating a payment record associated with an appointment for a customer for a first service provided by a merchant, wherein the payment record includes at least an indication of the first service;
receiving an indication of at least one of a second service or an item being acquired by the customer from the merchant during the appointment;
updating the payment record to further include an indication of the at least one of the second service or the item; and
based at least in part on determining that a device associated with the customer is located outside of a threshold distance from a location of the appointment, sending a request for a payment corresponding to the payment record.

17. The method as claim 16 recites, wherein creating the payment record is responsive to determining that the device associated with the customer is within the threshold distance from the location of the appointment.

18. The method as claim 16 recites, further comprising:
receiving an indication of at least one of a third service or another item being acquired by the customer from the merchant during the appointment; and
updating the payment record to further include an indication of the at least one of the third service or the other item.

19. The method as claim 16 recites, wherein determining that the device associated with the customer is located outside of the threshold distance from the location of the appointment is based at least in part on location data, wherein the location data comprises one or more of data indicating proximity to a Bluetooth low energy device, global positioning system data, geolocation data, cell tower location data, wireless access point location data, or wireless beacon location data.

20. The method as claim 16 recites, wherein determining that the device associated with the customer is located outside of the threshold distance from the location of the appointment is based at least in part on receiving a push notification from the device associated with the customer.

\* \* \* \* \*